(12) United States Patent
Lampola

(10) Patent No.: US 6,668,052 B2
(45) Date of Patent: Dec. 23, 2003

(54) METHOD AND SYSTEM FOR SIGNALING IN A TELECOMMUNICATION SYSTEM

(75) Inventor: Pekka Lampola, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/076,385

(22) Filed: Feb. 19, 2002

(65) Prior Publication Data

US 2002/0131576 A1 Sep. 19, 2002

Related U.S. Application Data

(63) Continuation of application No. PCT/FI00/00698, filed on Aug. 17, 2000.

(30) Foreign Application Priority Data

Aug. 18, 1999 (FI) .............................................. 19991749

(51) Int. Cl.$^7$ .............................. H04J 3/12; H04M 7/00
(52) U.S. Cl. ....................... 379/230; 370/426; 370/522; 379/231; 379/234; 379/901
(58) Field of Search ................................. 370/426, 522, 370/524; 379/201.01, 201.02, 207.02, 221.08, 221.09, 221.1, 221.12, 221.14, 221.15, 230, 901, 231, 234

(56) References Cited

U.S. PATENT DOCUMENTS

| | | | | | |
|---|---|---|---|---|---|
| 5,553,130 | A | * | 9/1996 | Turner | .................... 379/221.08 |
| 5,768,358 | A | * | 6/1998 | Venier et al. | .......... 379/221.09 |
| 5,892,821 | A | | 4/1999 | Turner | .................... 379/221.08 |
| 5,956,652 | A | * | 9/1999 | Eriksson | ...................... 455/422 |
| 6,175,622 | B1 | * | 1/2001 | Chiniwala et al. | .......... 379/219 |
| 6,453,035 | B1 | * | 9/2002 | Psarras et al. | ......... 379/220.01 |

FOREIGN PATENT DOCUMENTS

| | | | | |
|---|---|---|---|---|
| WO | 9821903 | 5/1998 | ............. | H04Q/3/62 |
| WO | 9821904 | 5/1998 | ............. | H04Q/3/62 |

* cited by examiner

Primary Examiner—Harry S. Hong
(74) Attorney, Agent, or Firm—Antonelli, Terry, Stout & Kraus, LLP

(57) ABSTRACT

A method and a system for signaling used in a call setup in a telecommunication system comprising a telephone network, a Centrex exchange belonging to the telephone network and implementing a private number plan, a first telecommunication terminal, which is connected via a first Centrex subscription to the Central exchange, and a second telecommunication terminal, which is connected to the telephone network with a number comprised in the private numbering plan. In the method, a connection is set up between the first and second telecommunication terminals by using the number comprised in the private numbering plan. In the invention, the same APP parameter is used in the Centrex exchange, both for communication with another Centrex exchange and for communication with a VPN exchange, as is used by a OSIG VPN network in VPN ISUP signaling.

36 Claims, 3 Drawing Sheets

METHOD AND SYSTEM FOR SIGNALING IN A TELECOMMUNICATION SYSTEM

This is a continuation of application PCT/FI00/00698, filed Aug. 17, 2000.

BACKGROUND OF THE SYSTEM

The present invention relates to telecommunication systems. In particular, the invention concerns a method and system for signaling used in call setup.

A Centrex subscriber group is a subscriber group so implemented in a public exchange that, without being connected to a private automatic branch exchange, it can use functions typical of extensions connected to a PABX. A Centrex subscriber group is so implemented in the exchange that the exchange will provide a service resembling a PABX or a PABX network without employing separate branch exchanges. A feature typical of the functions of a Centrex exchange is a private numbering plan. It is a telecommunication service that allows the subscriber to use subscriber numbers deviating from the public numbering plan for communication between certain subscriptions within the area of one or more networks. The numbering plan can be implemented e.g. by reserving subscriber numbers beginning with a given sequence of digits for the use of an enterprise or a corresponding community.

A telephone exchange supporting the Centrex service is provided with a special database in which are stored all the numbers included in the public numbering plan that correspond to the private numbering plan. The Centrex service can be extended so as to allow it to be used between several telephone exchanges, in which case all the exchange have corresponding databases. In the signaling between two Centrex exchanges, a number included in a private numbering plan is converted into a number included in the public numbering plan. The subscriber, which may be e.g. an analog subscriber, an ISDN subscriber or a branch exchange, dials the numbers and the public network exchange performs the number conversion. If the subscriber dials a number included in a private numbering plan, then the public network exchange converts the number into a number consistent with the public numbering plan. In other words, the public telephone network uses numbers consistent with the public numbering plan, which are converted in Centrex exchanges so that the users of terminal equipment will see the numbers consistent with the private numbering plan. Therefore, for the operation of the Centrex system, a heavy database needs to be maintained, which means a waste of resources of the telecommunication system.

FIG. 1a is a diagrammatic representation of a prior-art system. Connected to a first exchange SW A is a Centrex subscription A. The Centrex subscription A implements a Centrex service that uses a private numbering plan in conjunction with the first exchange SW A. In the example, the Centrex service is implemented in the first exchange SW A, so the first exchange is a Centrex exchange. A corresponding service can also be implemented using an intelligent network.

A first telecommunication terminal TE1 is connected to the Centrex subscription A in the first exchange SW A using DSS1 signaling (DSS1, Digital Subscriber Signaling No. 1) or equivalent. The first exchange SW A is connected via a public telephone network ISDN to a second exchange SW B. For communication between the first and second exchanges, ISUP signaling (ISUP, ISDN User Part) is used.

In a corresponding manner, a second Centrex subscription B is connected to the second exchange SW B, which likewise is a Centrex exchange. Connected to the Centrex subscription B in the second exchange SW B is a second telecommunication terminal TE2 using DSS1 signaling. In the example, the subscriber lines of both terminals TE1, TE2 are comprised in a private numbering plan implemented via a Centrex service. The first and second telecommunication terminals TE1, TE2 may be ISDN subscribers, analog subscribers or branch exchanges.

In this prior-art solution, the first exchange SW A comprises a Centrex subscriber database, which contains all A-subscriber and B-subscriber numbers both in a long form and in a short form, i.e. in forms consistent with the public and the private numbering plans. Thus, e.g. a short B-subscriber number 123 corresponds to a long number 456 789. The first exchange SW A and the second exchange SW B have identical databases. When an A-subscriber calls a B-subscriber by dialing the number 123, this number is converted into 456 789 and the call is routed using the long number in the public telephone network ISDN.

When the second exchange B receives an A-subscriber number, e.g. 456 789, it checks the number received against the numbers in the Centrex database. If a corresponding number is found in the database, then the long number 456 789 is again converted into the short number 123, which is transmitted to the display 10 of the second terminal TE2, and the second terminal TE2 generates a ringing tone as used for internal calls. Thus, the user of the second terminal TE2 can recognize the incoming call as an internal call.

A private numbering plan and/or special group functions can also be implemented in a virtual private network VPN which uses signaling consistent with the QSIG standard. The virtual private network VPN is gaining ground in network solutions in which an economic network protected against outsiders is needed. QSIG is an ISDN common channel signaling system designed for use in private networks. The QSIG signaling was developed by an open group of enterprises including all of the largest European PABX manufacturers. The designation QSIG refers to signaling transmitted over an ISDN Q-point. QSIG defines a number of protocols which can be used for interaction between a plurality of PINX's (PINX, Private Integrated services Network eXchange). A PINX is connected to the nearest telephone exchange e.g. via a 2 Mbit/s link carrying QSIG signaling. A QSIG protocol largely resembles the ITU-T (International Telecommunication Union) Q.931 protocol. The essential difference between these is that Q.931 is an asymmetric protocol while QSIG is symmetric.

A virtual private network can also be utilized in an IP environment (IP, Internet Protocol), in which case it is possible to implement e.g. remote operation of a protected intranet used by an organization, i.e. an extranet. Extranet means a data network which is implemented between organizations using the Internet as a data transmission means and which can be used to interconnect the intranets of the organizations included in the system.

Using a virtual private network, it is possible to interconnect Centrex subscriber groups, Public Branch Exchanges (PBX) and individual subscribers. A VPN system can also be implemented using a public telephone network for data transmission. In the VPN system, a private numbering plan is identified by a special Corporate Network Identifier CNID. Subscriber identification is performed using a CNID parameter packed in the APP parameter (APP, Application Transport Parameter). The APP parameter additionally contains the A-subscriber and B-subscriber numbers in the private numbering plan, e.g. in the internal numbering used in an enterprise. However, matching VPN and Centrex systems is a problematic task because the prior art Centrex system does not understand the APP parameter used in QSIG signaling.

The object of the invention is to eliminate the problems referred to above. A specific object of the invention is to disclose a new type of method and system for signaling used for call setup in a situation where at least one of the telecommunication terminals belongs to a Centrex subscriber group. The present invention enables cooperation between a QSIG VPN network and a Centrex subscriber group in a manner transparent to the user, i.e. so that the user will perceive it as consistent cooperation regardless of the system to which the terminal equipment is connected.

SUMMARY OF THE INVENTION

The basic idea of the invention is to use in the Centrex exchange the same APP parameter as is used by a QSIG VPN network in VPN ISUP signaling, both for communication with another Centrex exchange and for communication with a VPN exchange.

The invention concerns a method for signaling used for call setup in a telecommunication system. The telecommunication system comprises a telephone network, a private numbering plan implemented in the telephone network and a Centrex exchange which belongs to the telephone network and implements the private numbering plan. The system further comprises a first telecommunication terminal, which is connected to the Centrex exchange via a Centrex subscription, and a second telecommunication terminal, which is connected to the telephone network with a number included in the private numbering plan. The second terminal is either a VPN subscriber or a Centrex subscriber. In the method, a connection is set up between the first and the second terminals by using the number included in the private numbering plan. According to the invention, when a connection is being set up from the first terminal to the second terminal, a parameter comprising an identifier corresponding to the private numbering plan as well as the identifiers of the calling and called subscribers in the private numbering plan is generated for the connection in the Centrex exchange. In addition, when a connection is being set up from the second terminal to the first terminal, the subscription of the second terminal is identified in the Centrex subscriber data by the said parameter.

In an embodiment of the invention, the said parameter is a CNID parameter consistent with the QSIG standard. The CNID parameter, which is included in the APP parameter, is stored in the subscriber data for the Centrex subscription in the public network subscriber database. When the Centrex subscriber sets up a call, the CNID parameter is retrieved from the subscriber database of the exchange and sent further in the network inside the APP parameter. In another application, this parameter is a short number consistent with the QSIG standard and is included in the APP parameter.

The APP parameter is preferably sent in an ISUP message during call setup. In an embodiment, the Centrex subscription is implemented as a QSIG-Virtual-Private-Network compatible subscription. In this case, the Centrex subscription is compatible with the QSIG system in respect of certain services. The value of the CNID parameter comprised in the APP parameter is stored in the Centrex exchange.

The second telecommunication terminal can be connected to an exchange or subscription that implements a corresponding functionality; in an embodiment, the second terminal is connected to an exchange implementing a QSIG-Virtual-Private-Network functionality. In another embodiment, the second terminal is connected to another Centrex subscription according to the present invention.

The invention also concerns a system for signaling used in call setup in a telecommunication system as described above. In the system of the invention, the Centrex exchange comprises means for generating for a connection being set up from a first telecommunication terminal to a second telecommunication terminal a parameter comprising an identifier corresponding to a private numbering plan as well as A-subscriber and B-subscriber identifiers in the private numbering plan. In addition, the Centrex exchange comprises means for identifying the subscription of the second terminal by the said parameter, which preferably is a CNID parameter consistent with the QSIG standard, when a connection is being set up from the second terminal to the first terminal. In another embodiment, the subscription is identified by a short number consistent with the QSIG standard and included in the APP parameter.

In an embodiment, the Centrex exchange comprises means for sending the APP parameter in an ISUP message when a connection is being set up. The Centrex subscription is preferably implemented as a QSIG-Virtual-Private-Network compatible subscription. In an embodiment, the Centrex exchange comprises a database for the storage of the CNID parameter comprised in the APP parameter. In practice, in an embodiment, the second terminal used is connected to a subscriber line implementing QSIG-Virtual-Private-Network functionality, in another embodiment it is connected to a Centrex subscriber line.

As compared with prior-art solutions, the invention has the advantage of obviating the need to provide in the Centrex exchange a resource-consuming database for each subscriber, such databases being difficult to maintain. Moreover, the invention enables a combination of Centrex and VPN services, thus allowing a private numbering plan and special group services to be used globally regardless of locally implemented exchange systems. Another solution for cooperation between a Centrex subscription and a VPN subscription would be to implement a Centrex subscriber database in the VPN exchange, which would enable the VPN exchange to function as a Centrex exchange. The solution of the present invention is better, cheaper and simpler than the prior-art Centrex system as it obviates the need to maintain heavy databases. Besides, the invention allows a more versatile operation of the exchange system; the QSIG emulation referred to allows the above-described Centrex VPN subscriber to act either as a Centrex subscriber or as a QSIG VPN subscriber. In addition, the subscriber is able to act in accordance with either type of functionality as required by the call in each case, which means that cooperation between Centrex and VPN systems is further improved.

BRIEF DESCRIPTION OF THE DRAWINGS

In the following, the invention will be described by the aid of a few examples of its embodiments with reference to the attached drawing, wherein.

DETAILED DESCRIPTION OF THE INVENTION

Figure 1A:
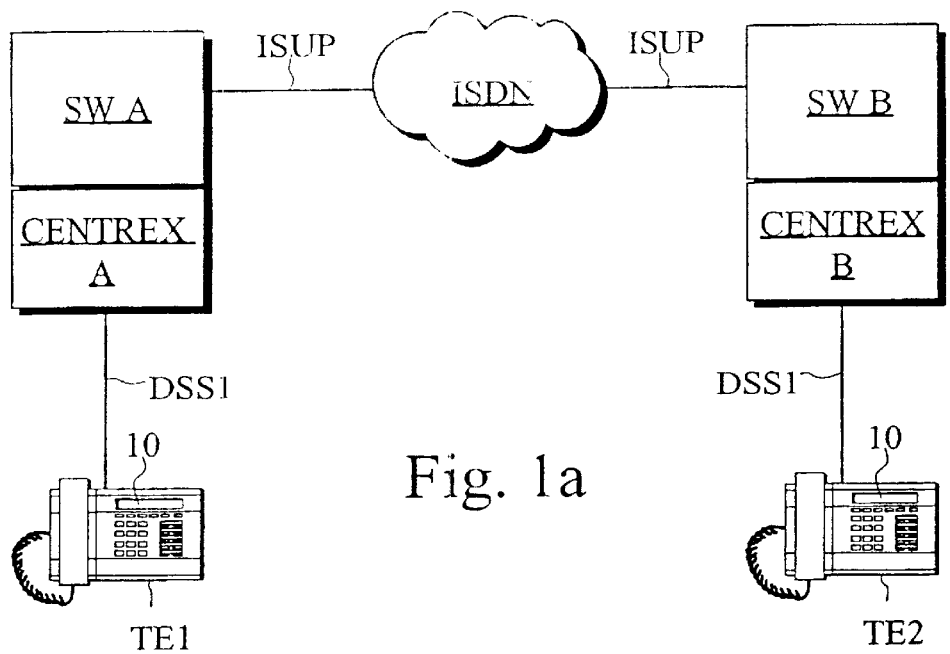
FIG. 1a presents a diagram representing a prior-art system.
Figure 1B:
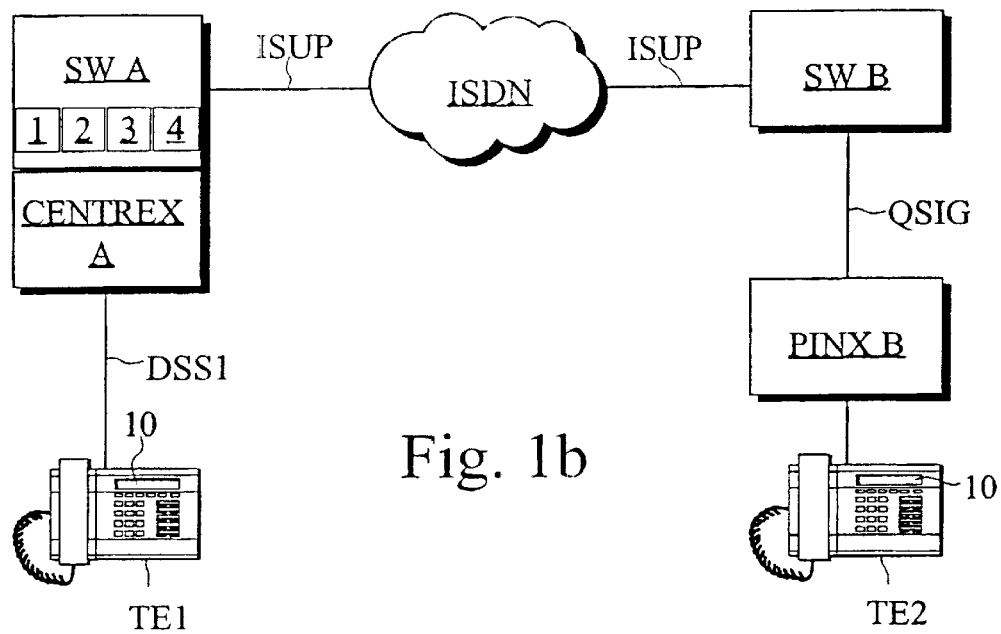
FIG. 1b presents a diagram representing a system according to the invention.

FIG. 1b presents a diagrammatic representation of a system in which a Centrex subscriber, i.e. a first terminal TE1, and a VPN subscriber, i.e. a second terminal TE2, are interconnected. In the case of the example, a connection is first set up from the first terminal TE1 to the second terminal TE2; in other words, the first terminal TE1 is an A-subscriber and the second terminal is a B-subscriber. The first terminal TE1 is connected to a telephone network ISDN in a manner corresponding to the case illustrated in FIG. 1a. Moreover, the first exchange SW A comprises means 1 for packing the corporate network identifier CNID and the short A-subscriber and B-subscriber numbers included in the private numbering plan into an APP parameter consistent with the QSIG standard. When the first exchange SW A is receiving the call from the second exchange SW B, the subscriber is identified by the data in the APP parameter transmitted by means 2 over the public telephone network ISDN using ISUP signaling. The APP parameter transmitted using ISUP signaling can also be used to transmit other information besides data consistent with the QSIG standard. The first exchange SW A also comprises means 3 for sending the APP parameter in conjunction with call setup to the second exchange SW B in the ISUP signaling used between the exchanges. The first exchange SW A further comprises a database 4, e.g. a subscriber database or a corresponding storage element, for the storage of the CNID parameter.

The means 1–4 to be provided in the Centrex exchange can be implemented e.g. via software, thus making it possible to utilize other means already implemented in the system, such as microprocessors and storage devices. These means 1–4 can also be implemented using discrete components, programmable circuits or an ASIC (Application Specific Integrated Circuit).

In the example in FIG. 1b, the second telecommunication terminal TE2 is connected to a VPN PBX subscription PINX B. The PBX subscription PINX B is connected to the second exchange SW B using signaling consistent with the QSIG standard. The signaling used between the PBX subscription PINX B and the second exchange SW B may be e.g. DSS1+ (Enhanced Digital Subscriber Signaling No. 1), PSS1 (Private Signaling System No. 1) or equivalent VPN signaling. The VPN PBX subscription PINX B and the second exchange SW B can also be combined to form a single functional aggregate. An example of exchanges according to the invention is the DX220 switching system manufactured by Nokia.

Figure 2A:
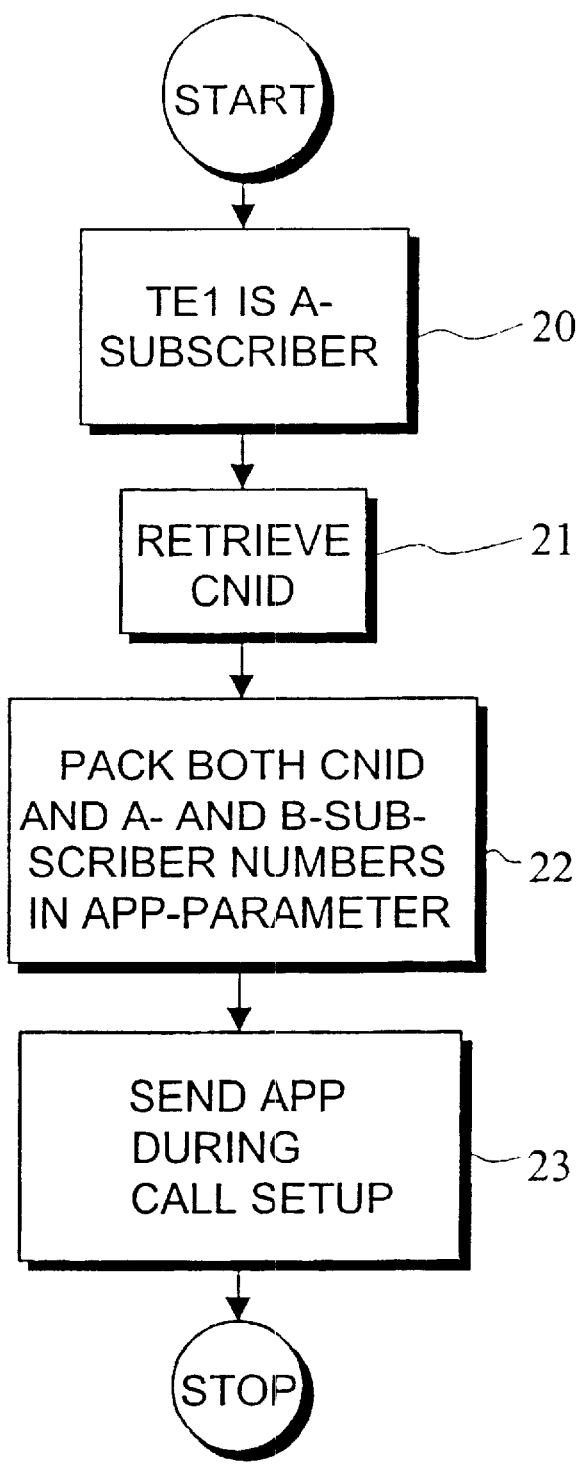
FIGS. 2a and 2b present flow diagrams illustrating certain embodiments of the method of the invention.

In the present invention, signaling consistent with the QSIG standard is used for the establishment of a private numbering plan and/or a company network. FIG. 2a illustrates the steps comprised in a method according to the invention, which are applied e.g. in a configuration as presented in FIG. 1b. In the method, the first telecommunication terminal TE1 is a Centrex subscriber and the second telecommunication terminal TE2 is a VPN subscriber. In step 20 in FIG. 2a, the first terminal TE1 is the A-subscriber, i.e. it is setting up a connection to the second terminal TE2. In step 21, the corporate network identifier CNID, which is stored in the database 4 of the first exchange SW A and which specifies the private numbering plan, is retrieved. In step 22, the corporate network identifier CNID and the short numbers of the A-subscriber and the B-subscriber included in the private numbering plan are packed into the APP parameter.

The above-mentioned APP parameter is sent in conjunction with call setup from the first exchange SW A to the second exchange SW B in ISUP signaling used between the exchanges, step 23. In an embodiment, the APP parameter is transmitted in an initial message IAM (Initial Address Message). In some embodiments, the APP parameter may also be sent in conjunction with subsequent messages. If the APP parameter comprises so much information that it cannot be carried in a single message, then it can be segmented into several messages. For segmentation, it is possible to utilize actual ISUP segmentation or APM segmentation (APM, Application Transport Mechanism) consistent with the QSIG standard.

The solution of the invention can also be used in a situation where both the A-subscriber and the B-subscriber are connected to a Centrex exchange. If the second terminal TE2 is connected to a Centrex exchange, then the APP parameter preferably has to be sent in the initial message. If the said parameter is not used at all or is void, then the receiving Centrex exchange B can find the long A-subscriber number in the database, convert the number into a short form and abandon QSIG VPN functionality between the terminals. In this case, the Centrex exchange receiving the call can identify the calling party by using old identification based on a number table. Having received the APP parameter in conjunction with call setup, the receiver can use the APP parameter data in Centrex exchange operations. In a preferred embodiment, the receiving Centrex exchange can accept QSIG functionality so that it will be seen as a QSIG compatible subscription by emulating QSIG functionality in respect of the basic call control functions.

The information required for implementing the private numbering plan is transmitted over the ISUP signaling between the first and second exchanges SW A, SW B by using the APP parameter. The second exchange SW B determines on the basis of the CNID identifier whether the incoming call is an internal one. If the first terminal TE1 is found to be included in a private numbering plan, then the second terminal TE2 rings with an internal call ringing tone. Depending on the type of subscription, the following data is sent to the subscriber:

To an analog Centrex subscriber, an internal call ringing tone is sent, and also the short number if a number display unit is in use;

To an ISDN Centrex subscriber, the short number of the calling subscriber is transmitted and the number is displayed. If the ISDN terminal can recognize an internal call, it may sound a ringing tone as used for internal calls;

To a QSIG/DSS1+ branch exchange or an exchange implementing corresponding functionality, the short A-subscriber and B-subscriber numbers are sent in conjunction with DSS1+ signaling in accordance with ISDN signaling, as well as a CNID value in the "VPN Indicator" information element.

To a QSIG/PSS branch exchange or an exchange implementing corresponding functionality, the short A-subscriber and B-subscriber numbers are transmitted in accordance with ISDN signaling.

Figure 2B:
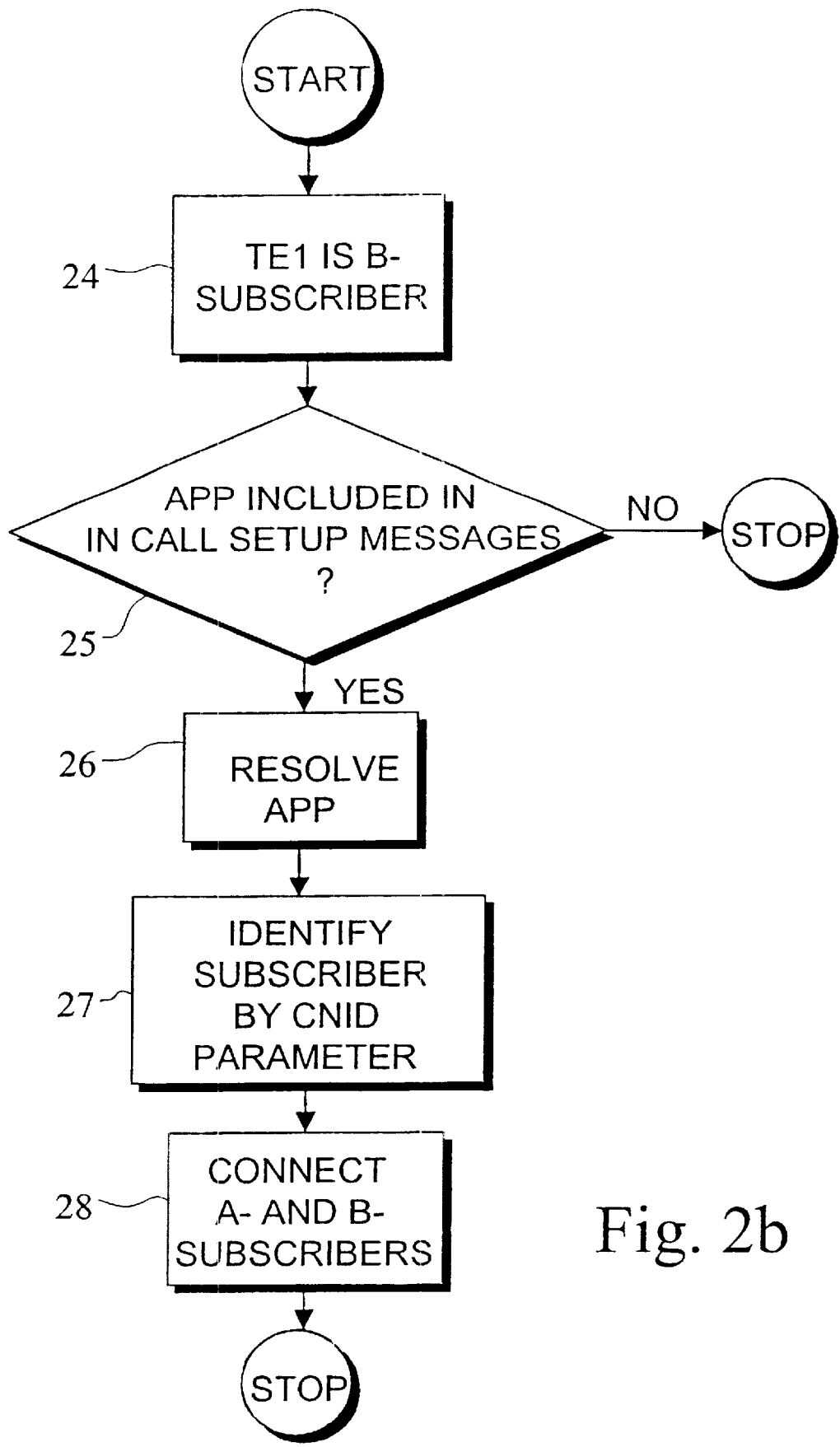

FIG. 2b presents a situation where a connection is set up from the second terminal TE2 to the first terminal TE1, the first terminal TE1 thus being the B-subscriber, step 24. The second terminal TE2, i.e. the A-subscriber, may be a Centrex or a VPN subscriber. In step 25, the ISUP message received is checked to establish whether it contains an APP parameter. The ISUP message is preferably an initial IAM message. If it does not contain an APP parameter, then, in one embodiment, the call setup procedure is continued as in prior-art technology; the A-subscriber is identified on the basis of the long number and the Centrex subscriber database is searched to establish whether it contains a corresponding number. In an embodiment, the first exchange SW A works transparently to the QSIG VPN branch exchange subscription by emulating QSIG functionalities in the basic call control functions.

If the message does include an APP parameter, then the procedure will go on to step 26, where the parameter data, i.e. the CNID identifier and the A-subscriber and B-subscriber numbers consistent with the private numbering plan, are resolved. In step 27, the subscriber is identified by the data obtained from the APP parameter received. The call is directed to the right user group on the basis of the corporate network identifier CNID and to the right B-subscriber on the basis of the short A-subscriber and B-subscriber numbers. In step 28, a connection is established between the first terminal TE1 and the second terminal TE2.

The invention is not restricted to the examples of its embodiments described above; instead, many variations are possible within the scope of the inventive idea defined in the claims.

What is claimed is:

1. A method for signaling used in call setup in a telecommunication system including a telephone network, a private numbering plan implemented in the telephone network, a Centrex exchange which belongs to the telephone network and implements the private numbering plan, a first telecommunication terminal, which is connected via a first Centrex subscription to the Centrex exchange, and a second telecommunication terminal, which is connected to the telephone network with a number included in the private numbering plan, said method comprising the steps of:
    setting up a connection between the first and second telecommunication terminals by using the number included in the private numbering plan,
    wherein when the connection is being set up from the first terminal to the second terminal, a parameter comprising an identifier corresponding to the private numbering plan as well as identifiers of the calling and called subscribers in the private numbering plan is generated for the connection in the Centrex exchange, and
    wherein when the connection is being set up from the second terminal to the first terminal, the subscription of the second terminal is identified in Centrex subscriber data by the said parameter.

2. A method as defined in claim 1, wherein said parameter is a Corporate Network Identifier (ON ID) parameter consistent with the ISDN Q-Point Signaling (QSIG) standard and is contained in the Application Transport (APP) parameter.

3. A method as defined in claim 1, wherein said parameter is a short number consistent with the ISDN Q-Point Signaling (QSIG) standard and is contained in the Application Transport (APP) parameter.

4. A method as defined in any one of claims 1–3, wherein the APP parameter is transmitted in an ISDN User Part (ISUP) message during call setup.

5. A method as defined in any one of claims 1–3, wherein the Centrex subscription is arranged to be a QSIG Virtual Private Network compatible subscription.

6. A method as defined in any one of claims 1–3, wherein the value of the Corporate Network Identifier (CN ID) parameter comprised in the APP parameter is saved in the Centrex exchange.

7. A method as defined in any one of claims 1–3, wherein the second terminal is connected to a Private Branch Exchange (PBX) subscription implementing QSIG Virtual Private Network functionality.

8. A method as defined in any one of claims 1–3, wherein the second terminal is connected to a Centrex exchange.

9. A method as defined in claim 4, wherein the Centrex subscription is arranged to be a QSIG Virtual Private Network compatible subscription.

10. A method as defined in claim 4, wherein the value of the Corporate Network Identifier (CNID) parameter comprised in the APP parameter is saved in the Centrex exchange.

11. A method as defined in claim 5, wherein the value of the Corporate Network Identifier (ON ID) parameter comprised in the APP parameter is saved in the Centrex exchange.

12. A method as defined in claim 4, wherein the second terminal is connected to a Private Branch Exchange (PBX) subscription implementing QSIG Virtual Private Network functionality.

13. A method as defined in claim 5, wherein the second terminal is connected to a Private Branch Exchange (PBX) subscription implementing QSIG Virtual Private Network functionality.

14. A method as defined in claim 6, wherein the second terminal is connected to a Private Branch Exchange (PBX) subscription implementing QSIG Virtual Private Network functionality.

15. A method as defined in claim 4, wherein the second terminal is connected to a Centrex exchange.

16. A method as defined in claim 5, wherein the second terminal is connected to a Centrex exchange.

17. A method as defined in claim 6, wherein the second terminal is connected to a Centrex exchange.

18. A method as defined in claim 7, wherein the second terminal is connected to a Centrex exchange.

19. A system for signaling used in call setup in a telecommunication system comprising:
    a telephone network;
    a private numbering plan implemented in the telephone network;
    a Centrex exchange belonging to the telephone network and implementing the private numbering plan;
    a first telecommunication terminal connected via a first Centrex subscription to the Centrex exchange; and
    a second telecommunication terminal connected to the telephone network with a number included in the private numbering plan,
    wherein a connection is set up between the first and second telecommunication terminals by using the number included in the private numbering plan,
    wherein the Centrex exchange comprises means for generating, for a connection being set up from the first terminal to the second terminal, a parameter comprising an identifier corresponding to the private numbering plan as well as identifiers of the calling and called subscribers in the private numbering plan, and
    wherein the Centrex exchange comprises means for identifying a subscription of the second terminal by the said parameter, when a connection is being set up from the second terminal to the first terminal.

20. A system as defined in claim 19, wherein the said parameter is a Corporate Network Identifier (CNID) parameter consistent with the ISDN O-Point Signaling (OSIG) standard and is included in the Application Transport (APP) parameter.

21. A system as defined in claim 19, wherein the said parameter is a short number consistent with the ISDN O-point Signaling (OSIG) standard and is included in the Application Transport (APP) parameter.

22. A system as defined in any one of claims 19–21, wherein the Centrex exchange comprises means for sending the APP parameter in an ISDN User Part (ISUP) message during call setup.

23. A system as defined in any one of claims 19–21, wherein the Centrex exchange has been arranged to be a OSIG Virtual Private Network compatible subscription.

24. A system as defined in any one of claims 19–21, wherein the Centrex exchange comprises a database for the storage of the CNID parameter included in the APP parameter.

25. A system as defined in any one of claims 19–21, wherein the second terminal is connected to a Private Branch Exchange (PBX) subscription implementing QSIG Virtual Private Network functionality.

26. A system as defined in any one of claims 19–21, wherein the second terminal is connected to a Centrex exchange.

27. A system as defined in claim 22, wherein the Centrex exchange has been arranged to be a QSIG Virtual Private Network compatible subscription.

28. A system as defined in claim 22, wherein the Centrex exchange comprises a database for the storage of the CNID parameter included in the APP parameter.

29. A system as defined in claim 23, wherein the Centrex exchange comprises a database for the storage of the CNID parameter included in the APP parameter.

30. A system as defined in claim 22, wherein the second terminal is connected to a Private Branch Exchange (PBX) subscription implementing QSIG Virtual Private Network functionality.

31. A system as defined in claim 23, wherein the Centrex exchange comprises a database for the storage of the CNID parameter included in the APP parameter.

32. A system as defined in claim 24, wherein the Centrex exchange comprises a database for the storage of the CNID parameter included in the APP parameter.

33. A system as defined in claim 24, wherein the second terminal is connected to a Centrex exchange.

34. A system as defined in claim 23, wherein the second terminal is connected to a Centrex exchange.

35. A system as defined in claim 24, wherein the second terminal is connected to a Centrex exchange.

36. A system as defined in claim 25, wherein the second terminal is connected to a Centrex exchange.

* * * * *